United States Patent [19]

Bocquillon et al.

[11] 3,890,591

[45] June 17, 1975

[54] GROUPING OF ELECTRO-ACOUSTIC TRANSDUCERS PARTICULARLY FOR USE IN UNDERWATER DETECTION SYSTEMS

[75] Inventors: François Bocquillon; Roger Massierá, both of Paris, France

[73] Assignee: Thomson-CSF, France

[22] Filed: Feb. 21, 1974

[21] Appl. No.: 444,649

[30] Foreign Application Priority Data
Feb. 22, 1973 France............................ 73.06565

[52] U.S. Cl.................... 340/6 R; 310/8.1; 310/9.8; 340/6.5; 340/10
[51] Int. Cl............................................... G01s 3/80
[58] Field of Search........ 340/6 R, 8 R, 9, 10, 16 R; 310/8.1, 9.7, 9.8

[56] References Cited
UNITED STATES PATENTS
3,114,849 12/1963 Poschenrieder .................... 310/9.7
3,559,162 1/1971 Granfors et al. ................. 340/6 R X
3,706,925 12/1972 Engelhardt....................... 340/10 X Primary Examiner—Richard A. Farley
Attorney, Agent, or Firm—Oblon, Fisher, Spivak, McClelland & Maier

[57] ABSTRACT

A grouping of electro-acoustic transducer units forming a directional array for acoustic waves multibeams reception.

In the array, groups are formed with transducer units of the Langevin piezoelectric sandwich type in which at least one electrode has sectors with a flat conductive surface which form separate isolated sub-electrodes. In one embodiment a printed circuit provides said sub-electrodes and the areas of the conductive surfaces are selected to be proportional to desired weighting coefficients. The fixed beams are preformed by the way in which the separate subelectrodes associated with the various transducer units of the array are wired up.

10 Claims, 3 Drawing Figures

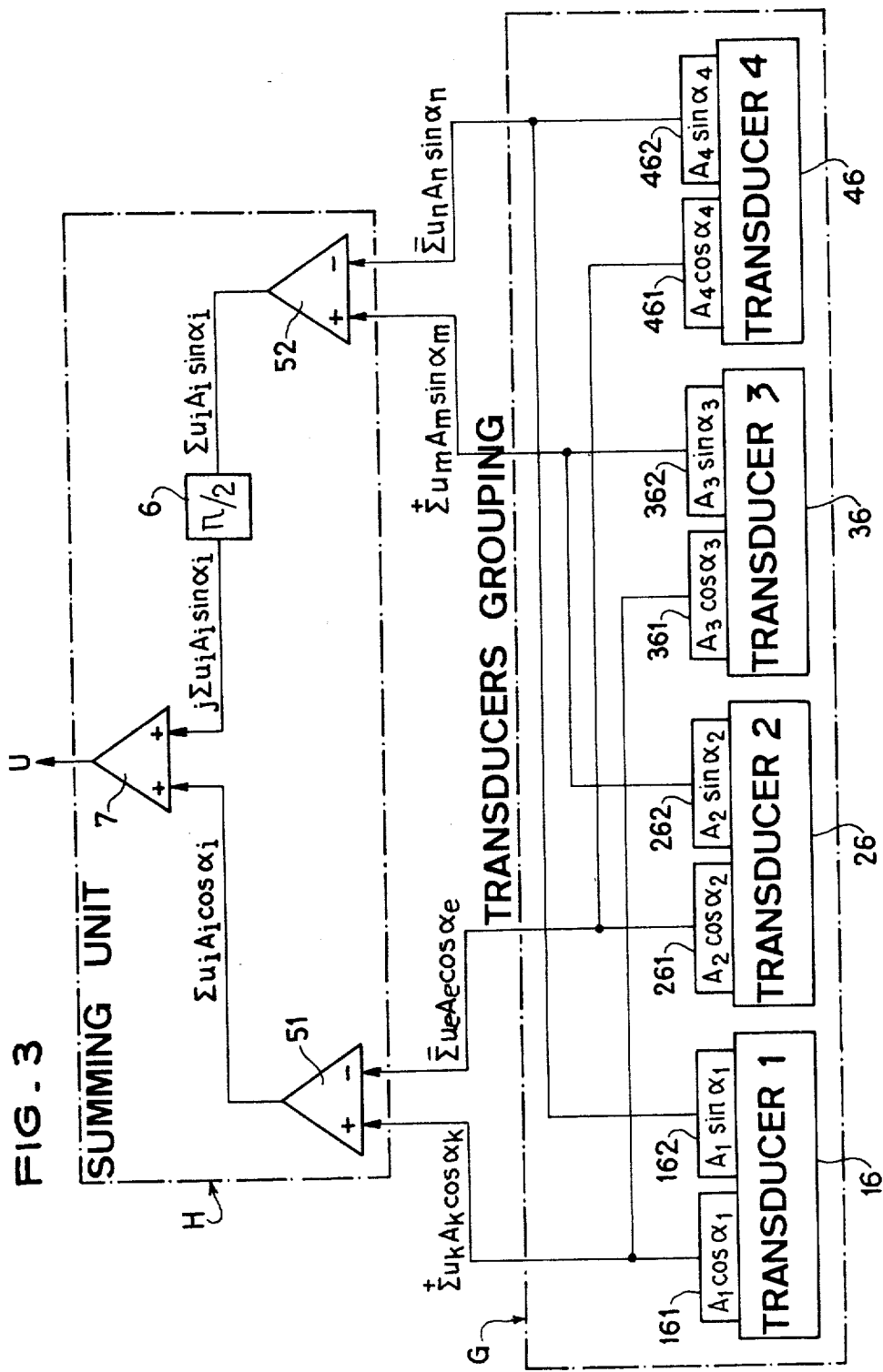

GROUPING OF ELECTRO-ACOUSTIC TRANSDUCERS PARTICULARLY FOR USE IN UNDERWATER DETECTION SYSTEMS

BACKGROUND OF THE INVENTION

The present invention generally relates to a grouping of electroacoustic transducers, particularly for use in underwater detection systems. It is mainly concerned with an array-type groupings of directional electroacoustic transducer units in which, the preformation of a plurality of beams or reception channels realized by combining the signals of an array group formed by interconnecting some or all of the transducer units, necessitates only a reduced number of ancillary electronic circuits, the number even being zero when the preformed acoustic energy wave-beams are amplitude and phase-weighted and are without angle departure in the axial direction.

It will be recalled that electro-acoustic transducers possess the property of reversibility, which enables them to be employed in underwater acoustics as projectors during transmission and as hydrophones during reception, especially in active and passive underwater detection system.

DESCRIPTION OF PRIOR ART

In the prior art, it is known to make use of various modes of vibration of a hollow cylindrical transducer made of piezoelectric ceramic which has a number of sectors distributed over the walls of a cylinder, these sectors forming axially superimposed and mutually isolated annular electrodes, with each pair of electrodes corresponding to a particular mode of vibration. Constructions of this type are described, for example, in U.S. Pats. Nos. 3 559 162 and 3 564 491 and are only applicable to tubular piezoelectric ceramics. With a construction of this type it is possible to form beams with angle departure produced by sine and cosine weighting, using piezoelectric ceramics which are divided into sectors which make use of the various modes of vibration of these ceramics. However, each ceramic can only be excited by a single mode of vibration at a time, which makes it impossible to overlap a number of beams. The formation of beams with angle departure has also been described, for example in French Pat. No. 1 353 531.

Thus, in an acoustic grouping of electro-acoustic transducers of an array, it is known to interconnect selected transducer units to form separate electrical groupings so as to produce fixed, preformed reception channels or beams. To this end,, ancillary electronic circuits are generally used to effect the amplitude and phase-weighting, as well as the summation of the output electrical signals from the transducers in each grouping.

A drawback of such groupings lies in the considerable number of ancillary electronic circuits required to form fixed and overlapping reception beams. Furthermore, the greater the number of transducer units in an arrangement, more electrical connections between these transducers and their associated electronic circuits are necessary and this may be a particular disadvantage when the allowable space required by the connections cannot exceed a relatively small size, which is the case in a considerable proportion of ships, where in addition attempts are made to reduce as much as possible the number of electronic circuits associated with the submerged sensing unit.

SUMMARY OF THE INVENTION

In accordance with one aspect of the present invention, the drawbacks mentioned are substantially reduced or avoided by a stable preforming of acoustic energy wave beams capable of overlapping simply by pre-wiring the grouping of transducer units, the number of connections between the grouping and its associated receiver circuits being the same as the number of separate beams so formed.

This aspect is achieved, in accordance with the invention, by using electro-acoustic transducers, the active or "driving" part of which is made of piezoelectric material and comprises at least one electrode made up from a number of sectors which are electrically insulated from one another.

In accordance with another aspect of the invention, by choosing the areas of these various sectors it is further possible to amplitude-weight the electrical signals supplied by the transducers, the beam-forming being then realized simply by interconnecting these areas in parallel.

Briefly, in accordance with this invention, the foregoing and other objects are in one aspect attained by providing a grouping of electro-acoustic transducer units into a directional array, transducer units of which have an active part, termed the "driver", which is formed from wafers of piezoelectric material provided with electrodes on two opposing parallel faces, wherein at least one of the said electrodes consists of conductive surface sectors which are electrically isolated from one another and which thus divide the electrode into a plurality of separate sub-electrodes located in identical cross section planes of said wafers.

In accordance with another feature, the separate sub-electrodes are formed by the conductive areas of a printed circuit, the sectors being concentric and discontinuous.

In accordance with yet another feature, the printed circuit is double-sided, the said sectors are annular and their connections are at the edge of the insulating board of the said circuit.

For reception in which the acoustic wave energy beam is preformed, the electrical signals supplied by the transducers are amplitude-weighted.

In accordance with yet another feature, the area selected for each of the sectors forming a separate sub-electrode is proportional to a given coefficient of the amplitude-weighting desired corresponding to the output signals from the various transducer units which are connected in parallel as a result of their sector electrodes interconnected in a specific way.

BRIEF DESCRIPTION OF THE DRAWINGS

Other features and advantages of the present invention will become apparent in the course of the following description, which is given as a non-limiting example, and which refers to the accompanying figures which show:

FIG. 3, a block diagram showing the way in which a beam with angle departure is formed in accordance with the invention.

DETAILED DESCRIPTION OF THE PREFERRED EMBODIMENTS

Figure 1:
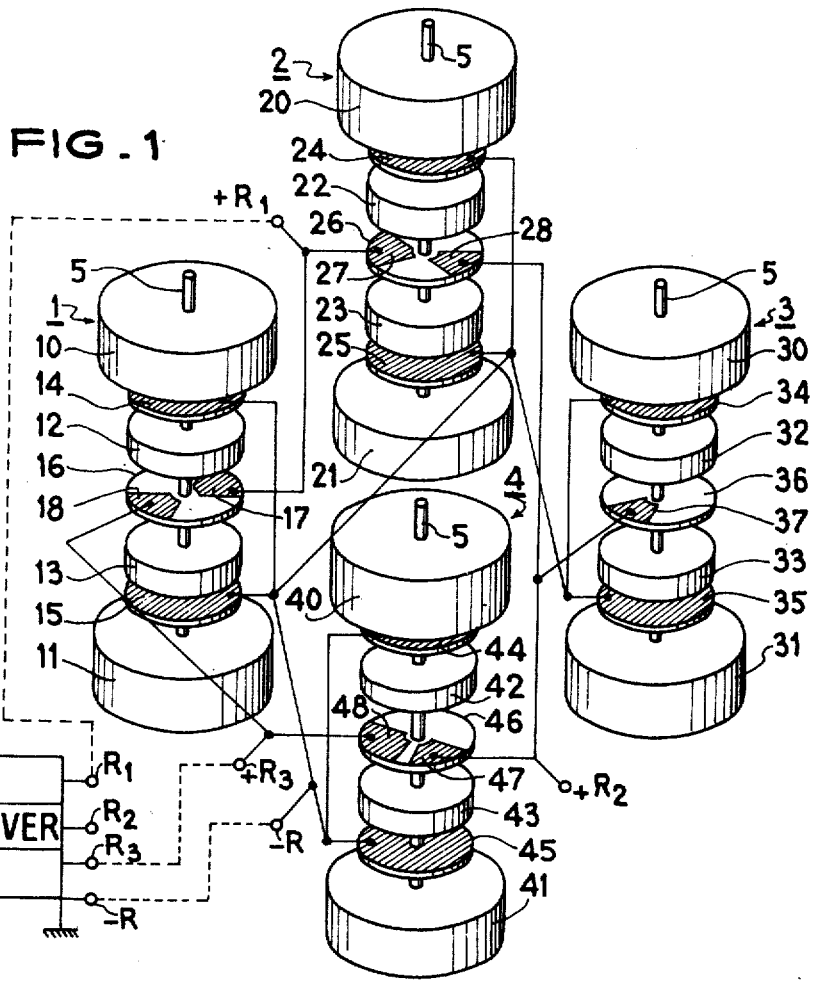
FIG. 1, a partial exploded view of a grouping of transducer units according to the invention.

It is known that, in the case of a polarised wafer of ceramic piezoelectric material which has at least two parallel plane faces each of which is provided with an electrode and which is subject to the vibrating action of an acoustic pressure $p$ the frequency of which is very much lower than the first resonant mode of the wafer, the equivalent electrical circuit consists of a voltage generator $u = k_1 p$ in series with a capacitor whose capacitance is $C = k_2 S$, where $k_1$ and $k_2$ are constants for the wafer in question and S is the area of the smaller of the two electrodes, assuming that the electrodes have different areas.

If n ceramic wafers similar to that described above are considered, all of which have the same constants $k_1$ and $k_2$ and the areas of the electrodes of which are respectively $S_1, S_2, \ldots S_i, S_n$, these wafers being lined up in a linear array with a gap $d_i$ between the wafer in position $i$ and that in position 1, and if the array so formed receives a plane acoustic wave at an angle of incidence $\theta$ with respect to a plane at right angles to the linear array, it is known that the expression which gives the distribution of pressure $p_i$ along this network is $$p_i = p_i\, e^{j\phi} i \text{ with } \phi_i = \frac{2\pi d_i}{\lambda} \sin\theta,$$

$\lambda$ being the acoustic wave length.

By connecting all the $n$ ceramic wafers in parallel, it can be shown, on the basis of the equivalent electrical circuit for this array, that the expression for the voltage U which appears at the terminals of the arrangement is $$U = u_1 \frac{\sum_{1}^{n} S_i e^{j\phi_i}}{\sum_{1}^{n} S_i}$$

and thus has a linear relationship with the areas $S_i$ of the electrodes associated with each of the components in the array.

It is known that, to obtain a reception beam aligned along the central plane of a linear array comprising identical sensing transducers which are not connected in parallel and which presents a predetermined directivity function, it is necessary to correct each acoustic signal supplied by the various components of the array by means of an amplitude-weighting circuit before forming the sum of the signals, this summing operation being then carried out by means of an electronic circuit such as an operational amplifier. The voltage U thus obtained at the output from this electronic circuit is expressed by $$U = u_1 \sum_{1}^{n} A_i\, e^{j\phi_i}$$

where $A_i$ represents the selected amplitude-weighting coefficients. Comparing this expression for voltage U with that obtained using a linear array of which the sensors are all connected in parallel, it would appear that the same result may be achieved in both cases provided that the electrode areas $S_i$ selected are proportional to the appropriate weighting co-efficients $A_i$ required. The same argument holds good for a two or three-dimensional transducer array and for a curved array.

Thus, in accordance with the invention, an axial directional beam is produced and the signal is amplitude-weighted by using an array of electro-acoustic transducers in which the transducers are formed from piezoelectric ceramic wafers electrically combined in parallel, the areas of the electrodes associated with the wafers being made proportional to the desired amplitude-weighting coefficients. If the ceramic wafers in the transducer units are all identical, this means that at least one of their electrodes will not cover the whole of the surface area of the ceramic. It is thus possible to arrange other electrodes on this surface and these will enable this same transducer to be used for a number of separate overlapping channels, provided that the electrodes on the same surface of the wafer are well insulated from one another electrically.

FIG. 1 is an exploded diagram showing a partial view of an embodiment of a grouping of transducers in accordance with the invention, in which the conventional protective and mounting members have been omitted so as not to obscure the drawing. For the same reason,, the associated electronic circuits belonging to the receiver to which lead the output terminals of the grouping of transducers are shown schematically by blocks.

The grouping shown consists of a plane bilinear array of four electro-acoustic transducers 1 to 4 of the "Langevin piezoelectric sandwich" type which have a pre-stressing rod 5, such transducers being known by the name "Tonpilz." A transducer such as 1 is made up of a passive part, which may be of metal, and which is formed by a front plate 10 and a back plate or counterplate 11, between which is inserted the active or driver part which is formed by a stack of circular wafers 12 and 13 made of piezoelectric ceramic. In the example chosen for FIG. 1, these wafer plates 12 and 13 are two in number, carry electrodes 14, 15 and 16, and are mounted in phase opposition.

In a particular known type of embodiment, which is not shown in FIG. 1, the electrodes 14, 15 and 16 consist of metallic areas which are silver-plated onto the flat surfaces of wafers 12 and 13.

In accordance with the invention, the electrode 16 carried by the adjoining faces of vafers 12 and 13 is divided in two sub-electrodes made of separate circular sectors 17 and 18 produced by silver-plating. However, a major drawback of this embodiment lies in the difficulty which there is in ensuring that the corresponding metal electrodes of wafers 12 and 13 lie exactly above one another after assembly.

The difficulty is overcome in accordance with the invention by producing the electrodes such as 16 as double-sided printed circuits. The appropriate faces of wafers 12 and 13 then have no silver plated areas and the insulating board 16 of the double-sided printing circuit, which carries the sub-electrodes 17 and 18 on either side, is enclosed between the faces of these wafers. In the example shown in FIG. 1, the electrodes 14, 24, 34, 44 and 15, 25, 35, 45 are all connected to a common terminal − R. Sector 17 of electrode 16 in transducer 1 and sector 27 of electrode 26 in transducer 2 are connected to a common terminal + $R_1$ and define a first reception beam $F_1$. Sector 28 of electrode 26 in transducer 2, sector 37 of electrode 36 in transducer 3 and sector 47 of electrode 46 in transducer 4 are connected to a terminal + $R_2$ and thus define a second reception beam $F_2$ which overlaps with $F_1$. A third beam $F_3$ which overlaps with $F_1$ and $F_2$ is produced by connecting sectors 18 and 48 of electrodes 16 and 46 in transducers 1 and 4 to a common terminal + $R_3$.

Figure 2:
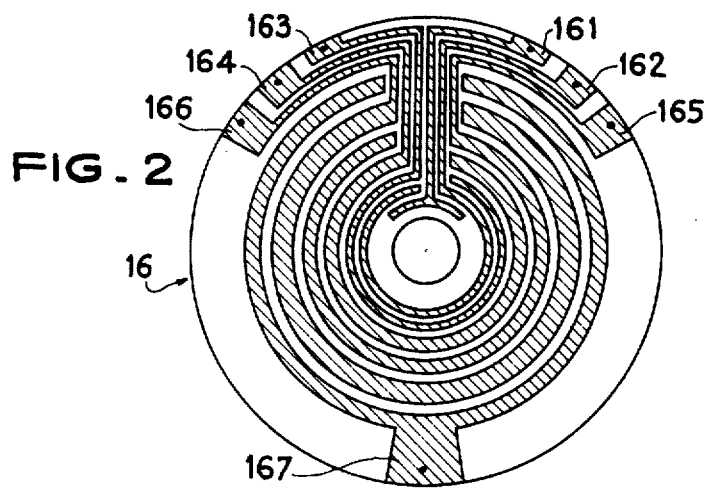
FIG. 2, a plan view of a preferred embodiment of a printed circuit electrode in accordance with the invention.

In order to avoid favouring certain directions of reception with respect to others, the sectors of the electrodes, such as 17 and 18, preferably take the form of plane unclosed concentric rings, as shown by the embodiment in FIG. 2. In addition, to enable boards such as 16 to be mass-produced, each of them has the same number of annular sectors 161 to 167. Also, a number of these sectors may have the same area, which enables a transducer used for a single amplitude-weighting coefficient to be used for two separate overlapping beams.

A group connecting of transducers in accordance with the invention also enables fixed and reception beams with angle departure to be formed. To this end, it is known to weight the signals $u_i$ supplied by each of the sensors on the one hand in conformity with an $A_i \cos \alpha_i$ weighting law and on the other hand in conformity with an $A_i \sin \alpha_i$ law, with $$\alpha_i = \frac{2\pi d_i}{\lambda} \sin \theta_o,$$

$\theta_o$ being the desired angle departure of the beam. After forming the sums $$\sum_1^n u_i A_i \cos \alpha_i \text{ and } \sum_1^n u_i A_i \sin \alpha_i$$

and shifting the phase of the latter by an amount equal to ($\pi/2$, summing the two values so obtained gives a voltage U representative of a beam having an angle departure equal to $\theta_o$:

$$U = u_1 \sum_1^n A_i \cos \alpha_i \, e^{j\varphi_i}$$
$$+ j u_1 \sum_1^n A_i \sin \alpha_i \, e^{j\varphi_i}$$

When the sums $$\sum_1^n A_i \cos \alpha_i \, e^{j\varphi_i} \text{ and } \sum_1^n A_i \sin \alpha_i \, e^{j\varphi_i}$$

are being calculated, account is taken of the fact that the cosines $\alpha_i$ and the sines $\alpha_i$ may also be negative, which requires four intermediate sums to be formed instead of two and then the signs of the negative sums to be changed.

In accordance with the invention, these intermediate sums are produced directly without ancillary electronic circuits by using electrodes, similar to electrode 16 shown in FIG. 2, which have an even number of separate sectors, the area of half of which is proportional to $A_i \cos \alpha_i$, whereas the area of the other half is proportional to $A_i \sin \alpha_i$.

As shown by the simplified diagram in FIG. 3, which is given by way of example and in which the four transducers 1, 2, 3 and 4 employed by grouping G to form a receiver beam with angle departure are represented only by their respective electrodes 16, 26, 36 and 46, these intermediate sums are obtained by connecting together in parallel, in four separate electrical groupings i.e.

$\Sigma^+ u_k A_k \cos \alpha_k$, $\Sigma^- u_l A_l \cos \alpha_l$,
$\Sigma^+ u_m A_m \sin \alpha_m$ and $\Sigma^- u_n A_n \sin \alpha_n$, respectively the sectors for positive values of $A_i \cos \alpha_i$, those for negative values of $A_i \cos \alpha_i$, those for positive values of $A_i \sin \alpha_i$ and those for negative values of $A_i \sin \alpha_i$, the connections being made directly within grouping G. The four intermediate sums so produced are then applied to a summing unit H of ancillary electronic curcuits which are separate from the transducers grouping G. This unit H includes two summing amplifiers 51 and 52 each of which has a sign-changing negative input — which receives the negative intermediate sums $\Sigma^-$ and a positive non-sign-changing input + which receives the $\Sigma^+$. Sums $\Sigma u_i A_i \cos \alpha_i$ and $\Sigma u_i A_i \sin \alpha_i$ are obtained at the output from amplifier circuits 51 and 52. The latter sum is applied to a ($\pi/2$) phase-shifter 6. A summing circuit 7 which receives the values $\Sigma u_i A_i \cos \alpha_i$ and $j\Sigma u_i A_i \sin \alpha_i$ at its two positive inputs delivers at its output the voltage U intended for processing by the receiver systems, these not being shown in FIG. 3.

The invention thus enables 4N summing circuits and 4N weighting circuits, where N is the number of separate preformed beams, to be done away with. It also enables the number of connections between the transducers grouping and the associated electronic circuits to be reduced.

There has thus been described a grouping of electro-acoustic transducers having fixed preformed beams which require a minimum number of ancillary electronic circuits and a minimum number of connections between the circuits and transducers making up the grouping.

Of course, the invention is not limited to the embodiment described and shown which was given solely by way of example.

What is claimed as new and desired to be secured by Letters Patent of the United States is:

1. A grouping of electro-acoustic transducer units into a directional array, wherein each said unit comprises: a front metal plate and a back metal plate, at least two piezoelectric wafers with two opposing parallel faces provided with electrodes forming an active part, termed the driver, stacked between said front and back metal plates of said transducer and wherein at least one of said electrodes comprises conductive areas formed by electrically insulated sectors which divide said electrode into a plurality of separate sub-electrodes located in identical cross section planes of said wafers.

2. A grouping according to claim 1, wherein the sector sub-electrode areas present different surface values, said values being proportional to desired amplitude-weighting coefficients which permit, by parallel connection of given sectors, realization of surfaces with surface values proportional to other amplitude-weighting coefficients in accordance with a predetermined relationship.

3. A grouping according to claim 1, wherein the sector subelectrodes are annular in shape and are concentric.

4. A grouping according to claim 1, wherein the electrodes are formed by the conductive surfaces of printed-circuit boards associated with the opposing and un-metallised parallel faces of the wafers of piezoelectric material.

5. A grouping according to claim 2, used for receiving acoustic waves and having amplitude-weighted preformed reception beams, wherein the signals combination providing the beams formation is realized by connecting together selected electrode sectors associated with the different transducers used for the same beam, the amplitude weighting being accomplished by selecting sectors the areas $S_i$ of which are proportional to the desired weighting coefficients $A_i$.

6. A grouping according to claim 5, in which at least two of the preformed reception beams overlap, wherein said overlapping is achievied by using two separate electrode sectors simultaneously in each of the transducer units common to these two beams.

7. A grouping according to claim 5, in which the preformed and amplitude-weighted reception beams present an angle departure, wherein the electrodes associated with the transducer units employed have an even number of sectors, the areas of half of which are proportional to the coefficients $A_1 \cos \alpha_i$ and those of the other half of which are proportional to coefficients $A_1 \sin \alpha_i$, with $$\alpha_i = \frac{2\pi d_i}{\lambda} \sin \theta_o,$$

where $d_i$ is the space between two transducer units, $\lambda$ is the medium wavelength in the receiver acoustic frequency band, and $\theta_o$ is the desired angle departure of the beam, the sectors being interconnected so as to form four separate electrical groupings which correspond, in the first case $\Sigma^+ u_k A_k \cos \alpha_k$ to the sum of the positive values of $A_i \cos\alpha_i$ in the second case $\Sigma^- u_1 A_1 \cos\alpha_1$ to the sum of the negative values of $A_i \cos \alpha_1$, in the third case $\Sigma^+ u_m A_m \sin \alpha_m$ to the sum of the positive values of $A_i \sin\alpha_i$, in the fourth case $\Sigma^- u_n A_n \sin\alpha_n$ to the sum of the negative values of $A_i \sin \alpha_i$, where $u$ represents a signal voltage from one sector, and wherein a summing unit of ancillary electronic circuits produces from these sums a voltage U characteristic of thus formed beam with angle departure.

8. A grouping according to claim 7, wherein the said summing unit comprises two adders each of which has one sign-changing input, the first adder supplying to one input of a third adder the sum $\Sigma u_i A_i \cos \alpha_i$, whereas the second adder supplies to another input of this same adder, via a ($\pi/2$) phase shifter, a value $j \Sigma u_i A phd i \sin \alpha_i$, the required voltage U being obtained at the output from this third adder.

9. A grouping according to claim 3, wherein the sector sub-electrodes are annular in shape and comprise a plurality of concentric unclosed rings having individual terminal connections.

10. A grouping according to claim 4, wherein the electrodes are formed by the conductive surfaces of printed-circuit boards associated with the opposing and un-metallised parallel faces of the wafers of piezoelectric material, the sector sub-electrodes being formed by unclosed rings having terminal connections provided at the edges of said printed-circuit boards.

* * * * *